UNITED STATES PATENT OFFICE.

JOHN A. VOLK, OF NEW POINT, INDIANA.

THRESHING-MACHINE.

SPECIFICATION forming part of Letters Patent No. 607,671, dated July 19, 1898.

Application filed February 20, 1897. Serial No. 624,368. (No model.)

*To all whom it may concern:*

Be it known that I, JOHN A. VOLK, a citizen of the United States, residing at New Point, in the county of Decatur and State of Indiana, have invented certain new and useful Improvements in Threshing-Machines; and I do hereby declare the following to be a full, clear, and exact description of the invention, reference being had to the annexed drawings, which form a part of this specification.

My invention comprises a specific combination of devices that enables the ready stoppage of a thresher-cylinder without interfering with the other operative parts of the machine, which result is accomplished by providing the cylinder-shaft with a shiftable driving-pulley having a clutch engaged with a hand-lever, and this lever is furnished with a brake or buffer adapted, whenever desired, to bear against the end of said cylinder. Furthermore, these devices are so arranged with reference to each other as to compel the brake to recede from the cylinder when the lever is so thrown as to advance the driving-pulley and bring it in frictional contact with a cone on the cylinder-shaft. As soon, however, as the pulley is retracted for the purpose of overcoming this frictional contact the brake bears against the end of the cylinder and instantly stops its turning, the operating-lever being provided with a spring-bolt to lock the pulley in either one of these positions, as hereinafter more fully described.

In the annexed drawings, Figure 1 is a horizontal section of a threshing-machine cylinder embodying my improvements, the brake being in contact with said cylinder. Fig. 2 is a similar section, but showing the brake shifted away from the cylinder.

A represents part of the side frame of a threshing-machine, and B is its cylinder secured to a shaft C, carrying a cone D.

E is the driving-pulley of the cylinder, which pulley has a tapering bore F, traversed by the aforesaid cone. Again, this pulley has a hub portion G, grooved circumferentially at H to admit the pin I of the hand-lever J, the latter being pivoted at K to a bracket L, projecting from the frame A. Coupled to this lever is a rod M, having a brake or buffer N, adapted, when desired, to bear against the end of cylinder B. Lever J is provided with a spring-bolt O, capable of being readily engaged with either one of a pair of notches P P' of the bracket L.

When my brake mechanism is in the position shown in Fig. 1 and the spring-bolt O engaged with the inner notch P, the buffer N bears against the end of cylinder B, and thus prevents it turning, while at the same time the driving-pulley E rotates freely on the cone D without imparting motion to the shaft C; but by simply disengaging the bolt from said notch and pulling the free end of lever J away from the frame A until said bolt O engages with the outer notch P', as shown in Fig. 2, the buffer N will be thrown out of contact with the cylinder and simultaneously therewith the pulley E will be wedged quite tightly on the cone D. Consequently the motion of said pulley will now be imparted to the shaft C and cylinder B.

I claim as my invention—

The combination in a threshing-machine, of a cylinder B, having a shaft C provided with a fixed cone D; a shiftable driving-pulley E carried by said cone, and having a tapering bore F and circumferential groove H; a hand-lever J, having a pin I engaged with said groove H; a buffer N and spring-bolt O, applied to said lever; and a pair of notches P, P', for said bolt to engage with, all as herein described.

In testimony whereof I affix my signature in presence of two witnesses.

JOHN A. VOLK.

Witnesses:
 JAMES H. LAYMAN,
 JESSE M. SIMON.